(12) United States Patent
Moy (10) Patent No.: US 8,762,756 B1
(45) Date of Patent: Jun. 24, 2014

(54) STATISTICAL APPROACH TO POWER MANAGEMENT FOR ELECTRONIC DEVICES

(75) Inventor: Steven Ka Cheung Moy, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 436 days.

(21) Appl. No.: 13/170,170

(22) Filed: Jun. 27, 2011

(51) Int. Cl.
*G06F 1/32* (2006.01)

(52) U.S. Cl.
USPC .......................... 713/321; 713/323; 713/324

(58) Field of Classification Search
USPC ................................................ 713/320–324
See application file for complete search history.

(56) References Cited

U.S. PATENT DOCUMENTS

| | | | |
|---|---|---|---|
| 5,799,256 A * | 8/1998 | Pombo et al. | 455/574 |
| 7,689,850 B2 * | 3/2010 | Cantwell et al. | 713/323 |
| 8,335,938 B2 * | 12/2012 | Orr et al. | 713/320 |
| 2008/0005381 A1 * | 1/2008 | Theocharous et al. | 710/18 |
| 2009/0218957 A1 * | 9/2009 | Kraft et al. | 315/291 |

* cited by examiner

*Primary Examiner* — Thuan Du
(74) *Attorney, Agent, or Firm* — Novak Druce Connolly Bove + Quigg LLP (57) ABSTRACT

Power savings is provided to users of various electronic devices by monitoring the times and locations at which those users activate, deactivate, or otherwise change an operational state of one or more functional elements of a device. Other contextual or environmental information can be captured as well when the user performs such an action. One or more statistical analysis or prediction algorithms can be used to determine when and/or where the user is likely to repeat the one or more actions, where a confidence level of the prediction can be impacted at least in part by the environmental and contextual factors. When a prediction has a minimum level of confidence, a corresponding action can be performed automatically by the device when the relevant factors are met. Changes in behavior can be monitored such that the predictions can be refined over time.

25 Claims, 6 Drawing Sheets

| Bluetooth | |
|---|---|
| Monday | On at home, 8:15-8:30; off at work 8:45-9:00 |
| Tuesday | On at home, 8:15-8:30; off at work 8:45-9:00 |
| Wednesday | On at home, 8:15-8:30; off at work 8:45-9:00 |
| Thursday | On at home, 8:15-8:30; off at work 8:45-9:00 |
| Friday | On at home, 8:20-8:30; off at work 8:50-9:00 |
| Saturday | Manual |
| Sunday | Manual |

STATISTICAL APPROACH TO POWER MANAGEMENT FOR ELECTRONIC DEVICES

BACKGROUND

People are utilizing portable electronic devices for an increasing number and variety of tasks. It is not uncommon for a user to have a personal media player, notebook computer, cell phone, and electronic book reader, among other such devices. Further, the demands on these devices increase as the devices offer enhanced functionality. For example, a tablet computer or portable gaming platform might perform most, if not all, of the tasks performed by the devices above. Thus, the amount of resource and power consumption required by these devices tends to increase, along with the need for the devices to have sufficient power for a user to utilize the devices as necessary.

In many instances a user will utilize certain functionality during certain times of day, such as using Bluetooth® while driving or WiFi while at home. If the user wants to conserve power on the device, the user might turn this functionality off when it is not needed. In many cases, however, the user will forget to turn the functionality off, which can lead to an unnecessary drain on power, as well as on aspects such as processing capacity and bandwidth. Further, even when the user remembers to turn the functionality off, the user might not enjoy having to continually turn certain functionality on and off each day.

BRIEF DESCRIPTION OF THE DRAWINGS

Various embodiments in accordance with the present disclosure will be described with reference to the drawings, in which:

FIGS. 3(a), (b), and (c) illustrate an example displays for states of an electronic device that can be used in accordance with various embodiments;

DETAILED DESCRIPTION

Systems and methods in accordance with various embodiments of the present disclosure overcome one or more of the above-referenced and other deficiencies in conventional approaches to conserving power for an electronic device. In particular, various embodiments utilize one or more learning models or algorithms to attempt to analyze user behavior patterns and predict when to activate, deactivate, or adjust an operational mode of at least one functional aspect of an electronic device. Various approaches analyze multiple parameters of information, such as may include time, location, and various environmental or contextual data when a particular functional aspect is activated, used, and/or deactivated, and attempt to determine probabilities of that component being activated, used, and/or deactivated at any given time. Based at least in part upon the determined probabilities, one or more functional aspects can be adjusted and/or power profiles executed automatically, without user intervention. As the user behavior changes, the probabilities will change and the times at which various power profiles are executed can be updated accordingly. The ability to automatically turn on and off functionality for the user helps to not only prevent the user from forgetting to activate or deactivate the functionality, but can also prevent the need to repeatedly go through the multiple steps necessary to adjust a functional setting of a device in many conventional interfaces.

In at least some embodiments where a user has a learning or intelligent management mode activated, a new computing device can begin monitoring behavior of a user with respect to the device. For example, the device can monitor when a user activates or deactivates certain functionality, such as activating Bluetooth functionality to synchronize with an automobile communication system while driving to work or WiFi functionality to access Web-based content while at home. The user might also in turn deactivate this functionality when leaving the respective environment. The device can also monitor other contextual information, such as the time of day or day of the week when the user performs that action. An application executing on (or in communication with) the computing device can attempt to perform statistical analysis on the collected data to attempt to predict user patterns with respect to various functionality of the device. When a particular action can be predicted with a minimum probability or level of confidence, for example, the device can begin to automatically adjust the functionality based on the predicted user behavior. User actions can be used to adjust the determined probability, as a user re-activating a functional mode can be indicative that the prediction was not accurate, etc.

In at least some embodiments, a user can be prompted to confirm an action the first few times an action is to be taken, or when the prediction falls below a determined level of confidence. After a certain level of confidence is obtained, the action can be taken automatically and without notification as long as the prediction remains accurate with at least that level of confidence. If there is a variation or exception, such as where the user goes to an appointment or goes on vacation instead of following a particular routine, the device might prompt the user to confirm whether the action should still be taken. Various other notifications can be provided as well as appropriate.

Further, additional information can be utilized as well within the scope of the various embodiments. For example, a computing device can analyze information in the user's schedule or calendar to attempt to predict user location or actions. The device might attempt to determine other people the user is with (as may be based on image recognition or device identifiers) to attempt to determine which power profile to activate. Other information such as motion, velocity, current activity, and the like can be considered in other algorithms.

In some embodiments, an electronic device can also predict whether that device is likely to run out of power before a next charging opportunity. For example, the device might be able to determine that the user is on the subway and will not be home for another 45 minutes, with the device having an estimated 30 minutes of power left at the current rate of power consumption. In such a situation, the device can be configured to, either automatically or upon user confirmation, adjust the functionality of the device in order to conserve power until such time as the device is able to be charged.

Various other approaches can be used as well within the scope of the various embodiments as discussed and suggested elsewhere herein.

Figure 1:
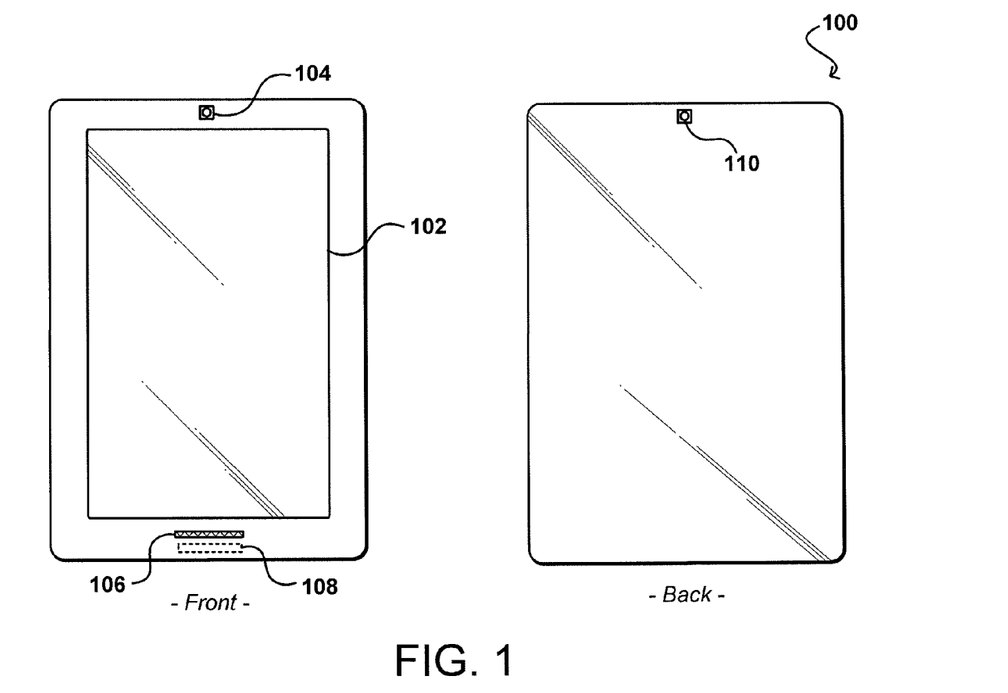
FIG. 1 illustrates front and back views of an example electronic device that can be used in accordance with various embodiments.

FIG. 1 illustrates front and back views, respectively, of an example electronic user device 100 that can be used in accordance with various embodiments. Although a portable computing device (e.g., an electronic book reader or tablet computer) is shown, it should be understood that any electronic device capable of receiving and processing input, or at least capable of communicating and/or being charged, can be used in accordance with various embodiments discussed herein, where the devices can include, for example, desktop computers, notebook computers, personal data assistants, smart phones, video gaming consoles, television set top boxes, and portable media players. In this example, the user device 100 has a display screen 102 on the front side, which under normal operation will display information to a user facing the display screen (e.g., on the same side of the computing device as the display screen). The computing device in this example includes at least one front image capture element 104 and at least one back image capture element 110 positioned on the device such that, with sufficient lenses and/or optics, the user device 100 is able to capture image information in substantially any direction about the computing device. The example user device 100 also includes at least one microphone 106 or other audio capture device capable of capturing audio data, such as words spoken by a user of the device or sounds indicative of an environment in which the device can currently be found.

The example user device 100 also includes at least one position and/or orientation determining element 108. Such an element can include, for example, an accelerometer or gyroscope operable to detect an orientation and/or change in orientation of the user device 100. An orientation determining element also can include an electronic or digital compass, which can indicate a direction (e.g., north or south) in which the device is determined to be pointing (e.g., with respect to a primary axis or other such aspect). A location determining element also can include or comprise a global positioning system (GPS) or similar positioning element operable to determine relative coordinates for a position of the computing device. Various embodiments can include one or more such elements in any appropriate combination. As should be understood, the algorithms or mechanisms used for determining relative position and/or orientation can depend at least in part upon the selection of elements available to the device.

Figure 2:
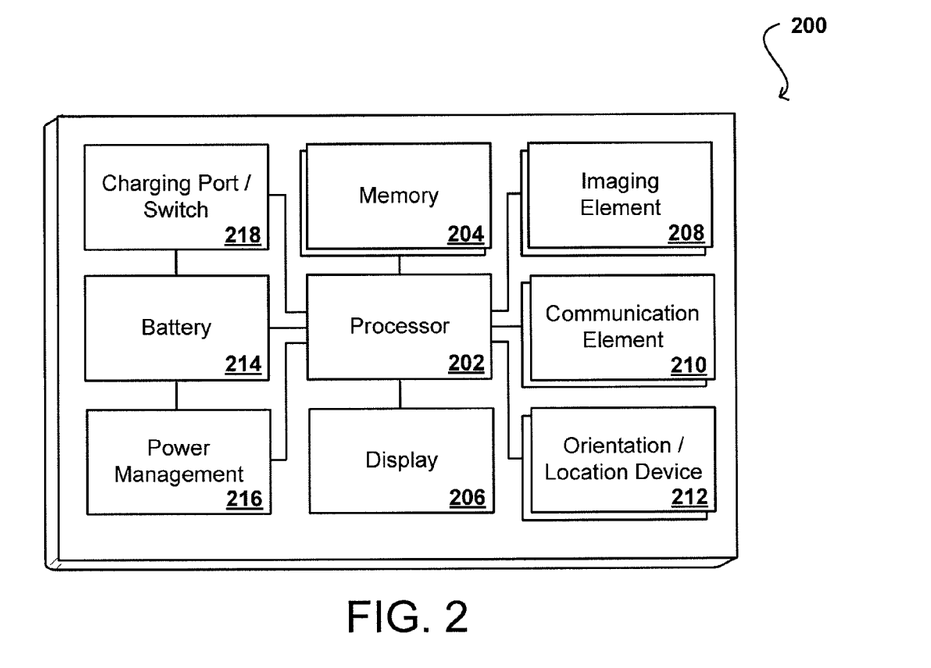
FIG. 2 illustrates example components of an example electronic device that can be used in accordance with various embodiments.

FIG. 2 illustrates a logical arrangement of a set of general components of an example computing device 200 such as the user device 100 described with respect to FIG. 1. In this example, the device includes a processor 202 for executing instructions that can be stored in a memory device or element 204. As would be apparent to one of ordinary skill in the art, the device can include many types of memory, data storage, or non-transitory computer-readable storage media, such as a first data storage for program instructions for execution by the processor 202, a separate storage for images or data, a removable memory for sharing information with other devices, etc. The device typically will include some type of display element 206, such as a touch screen or liquid crystal display (LCD), although devices such as portable media players might convey information via other means, such as through audio speakers. As discussed, the device in many embodiments will include at least one image capture element 208 such as a camera or infrared sensor that is able to image a user, people, or objects in the vicinity of the device. It should be understood that image capture can be performed using a single image, multiple images, periodic imaging, continuous image capturing, image streaming, etc. Further, a device can include the ability to start and/or stop image capture, such as when receiving a command from a user, application, or other device. The device also can include one or more orientation and/or location determining elements 212, such as an accelerometer, gyroscope, electronic compass, or GPS device as discussed above. These elements can be in communication with the processor in order to provide the processor with positioning and/or orientation data.

In some embodiments, the computing device 200 of FIG. 2 can include one or more sideband or other such communication elements (not shown), such as a Wi-Fi, Bluetooth, RF, or another wireless communication system, enabling the user device to communicate with other devices or components, such as a charger or docking station. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The example device 200 also includes a battery 214 or other appropriate power source. The power source can include, for example, at least one rechargeable battery, and can include other elements as well such as solar power cells or other such elements. The device also can include an intelligent charging port or switch 218, in at least some embodiments, which is controllable by the processor 202. The device might be plugged into an outlet or placed into a charging station, for example, but in at least some embodiments the charging switch 218 can control whether or not power is actually passed on to the battery for purposes of charging. For example, if the battery has almost no remaining charge then the switch might close in order to allow power to charge the battery, while in the case of a battery 214 that is nearly fully charged the charging switch 218 might open such that no charge passes to the battery at the current time. In some embodiments, the user can override such settings, whereby the device might always accept a charge or only accept a charge upon certain user settings, etc. An example device also can include at least one power management module or component 216, which can be implemented in software and/or hardware in communication with, or executed by, at least one processor 202 of the device 200. In at least some embodiments, the power management module 216 can monitor various aspects of the device, and its usage by a user, to determine when to adjust a functional state of at least one component of the device.

Figures 3A, 3B, 3C:
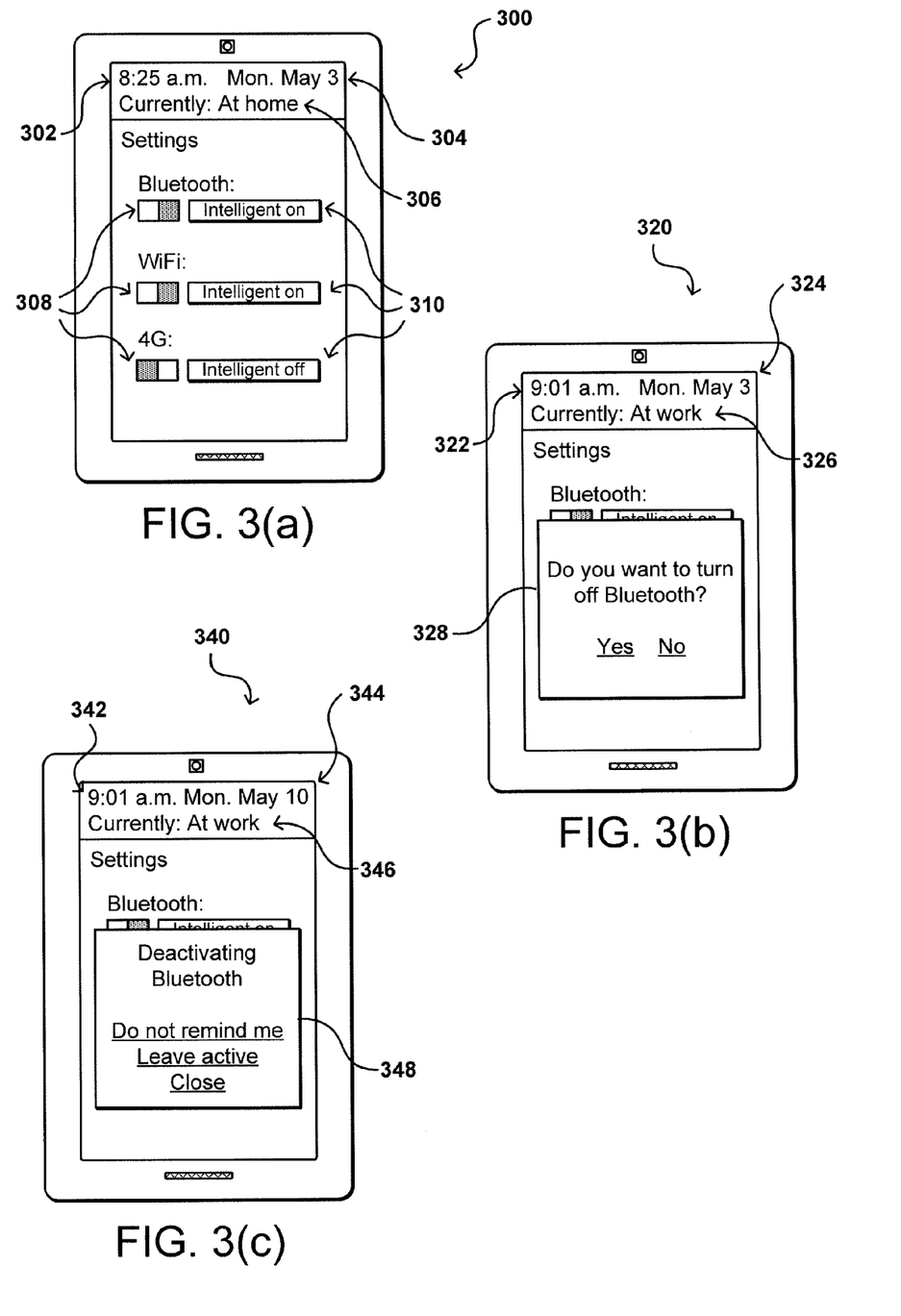

FIG. 3(a) illustrates an example state 300 of such a computing device that can be utilized in accordance with various embodiments. As discussed, such a device can monitor information about activities of a user with respect to the device, as well as environmental or contextual information associated with the device at the time of those activities. Such information can be analyzed using one or more statistical analysis approaches to attempt to determine how to adjust a power profile or mode of one or more components of the computing device. In this example, a user has brought up a settings interface on a display element of a computing device. The interface can include adjustable elements 308 enabling a user to manually adjust a functional state of one or more components of the device. In this example, the user has the option of turning on or off a selection of capabilities, including Bluetooth connectivity, WiFi connectivity, and 4G wireless connectivity. As is known for such functions, the functions can be useful at different times but can significantly drain battery power while active, such that it can be desirable to turn off at least some of these functions at certain times or locations. For example, a user might want to turn on Bluetooth when the user is driving an automobile so the user can utilize a wireless headset to place calls through the device, or run calls through a sound system of the vehicle. Similarly, a user want to turn off a 4G cellular connection when the user is in a meeting, in a movie theater, on a plane, etc., and might only utilize WiFi when at home or at a particular coffee shop.

Approaches in accordance with various embodiments can monitor changes in any of these or other such functional settings by a user. For example, the user in this example might turn on Bluetooth when the user leaves for work in the morning on a weekday. When the user switches the setting, the device can attempt to determine any relevant contextual or environmental data, such as a time 302 at which the setting was changed, a date or day of the week 304 when the setting was changed, and a geographic location 306 where the device was when the setting was changed. The time and date can be determined from system data, for example, and the location can be determined using any appropriate location determination mechanism, such as a global positioning system (GPS) element, calendar data, image analysis, etc. This information can be used to attempt to predict when a user is like to repeat the determined action.

The interface in FIG. 3(a) illustrates that at least some functions or components have a selectable element such as an "Intelligent Management" button. When a user selects intelligent management or another such option for a component, the device can attempt to predict when the user will change a functional mode of that component, such as to turn the component on or off, or enter the component into a low power mode. Initially, the device may have to collect several days worth of data to attempt to come to a consensus or at least predict a probability of an action with a minimum acceptable level of confidence. After about a week in some embodiments, the device might be able to start predicting when a user will perform a certain action.

For example, after a week an statistical analysis process might determine that the user turns on Bluetooth while near the user's home each weekday at around 8:25, give or take a window of plus or minus ten minutes. The process might also determine that the user turns off Bluetooth when the user arrives at work at around 8:55, give or take a window of plus or minus ten minutes. If the data points when analyzed suggest a sufficiently high probability that the user will repeat the behavior on the next weekday, the device can take an appropriate action that can vary among the various embodiments. As illustrated in the example state 320 of FIG. 3(b), the device can determine at a time within the window (e.g., time 322 and weekday 324) that the user shuts off Bluetooth, that when the user arrives at work the user will likely turn off Bluetooth. Accordingly, the device can generate a prompt 328 for the user asking whether the user would like to turn off Bluetooth. There can be one or more options enabling the user to provide input as should be apparent in light of the present disclosure.

If the user selects a "yes" or similar option, the device can turn off Bluetooth functionality. Such an approach can be beneficial for the user, as even though the user must manually accept an option (although the option might go away after a period of inactivity), the user is aware that Bluetooth has been turned off, and can select a single element to turn off Bluetooth without having to navigate through various screens or options to get to the appropriate setting.

In at least some embodiments, as the determined probability or level of confidence increases through, for example, the user confirming or repeating certain behavior, the device can begin to automatically adjust the functionality without first getting approval from the user. For example, FIG. 3(c) illustrates a state 340 of the device wherein the action can be predicted with a sufficient probability or confidence that the action can be performed automatically. In this example, the device determines that at the present time 342, weekday 344, and location 346 that the user will likely want to turn off Bluetooth, such that the device can perform the action automatically and provide a notification 348 to the user that the action is being taken. In at least some embodiments, the user can select to turn off the reminders, close the notification, override the action and leave Bluetooth active, or perform another such option. The notification might disappear after a period of inactivity. Such actions might continue to be performed automatically by the device as long as the action can be predicted with a certain minimum level of confidence or statistical probability.

Figure 4:
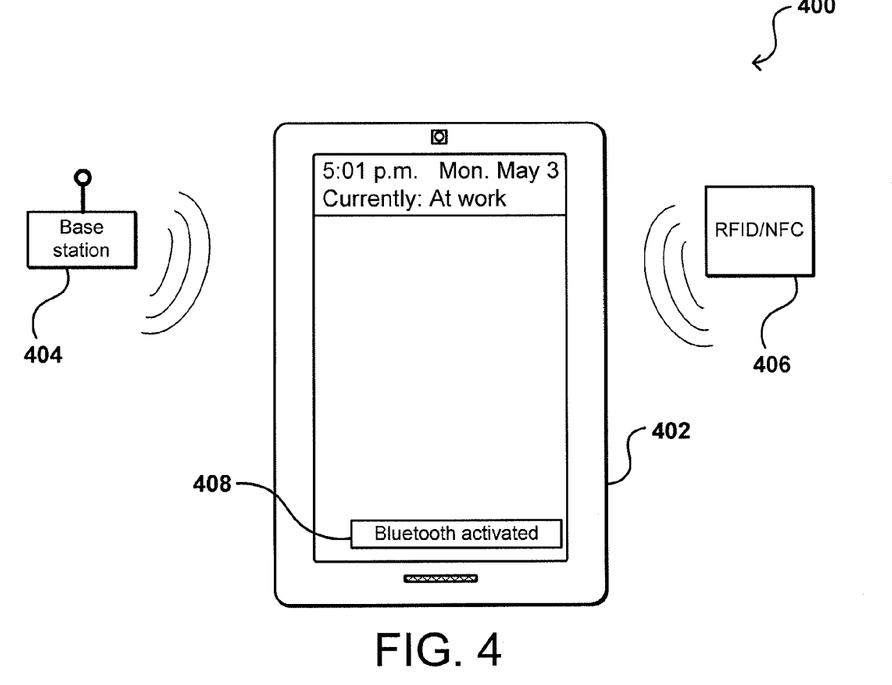
FIG. 4 illustrates an example situation wherein a device can determine a location based on proximity to another device or component in accordance with various embodiments.

As discussed, various other environmental information might be used as well within the scope of the various embodiments. For example, a user might occasionally sit in the user's car to finish making one or more personal calls before entering the workplace. Accordingly, the user might not want the device to turn off Bluetooth simply when the user pulls into the parking lot at work at the normal time. In some embodiments, the device can look for additional information that can indicate more accurately when the user would like to perform the action. In the example situation 400 of FIG. 4, the user has gotten out of the user's car and entered a building at work. Upon entering the building, passing through security, or at another appropriate location, the device 402 can come within range of a certain device, such as a WiFi base station 404 or location tag 406, such as an RFID or NFC tag as known in the art. If the device can determine with a higher confidence that the user is more likely to turn off Bluetooth when the user is near one of these devices than simply arriving at work, the portable computing device can wait until one of these location devices is detected, and then can perform the action. In some embodiments, a brief notification 408 can be presented any time a change in state is made, just to notify the user of the change, etc. In at least some embodiments, the user can turn off these notifications as well.

Such an approach can improve the user experience with the device, as the user will no longer have to manually activate and deactivate Bluetooth or other such functionality each weekday, but can obtain the power savings of having the functionality deactivated when not needed. Any appropriate functionality that is activated, deactivated, or placed in a specific state with relevant consistency that can be correlated with one or more environmental or contextual types of data can utilize such automated management in accordance with various embodiments.

As another example, a computing device might be able to determine from calendar, GPS, or other such data that a user is at an airport. If the device can access calendar or reservation information to determine the time at which user's flight is to depart, the device can automatically turn off certain functionality, such as 4G connectivity, that the user will not be able to use while on the plane. Further, the device can in some embodiments power itself off at an appropriate time before takeoff such that the user will comply with federal regulations, etc. If the user activates the device while on the plane, the device can already be in an "airplane" mode. In some embodiments, the device can turn itself back on a period of time after takeoff if the device is able to determine altitude, receive a notification from the airplane, etc. In some embodiments, the device can notify the user that the device is going to shut down in a period of minutes. If the device is able to obtain flight status information, the device can adjust this time based on an adjusted departure time of the flight.

Such a management and power savings approach can be used with any appropriate component, element, or function whose state can affect the power consumption of the respective electronic device. For example, in addition to the connectivity mechanisms discussed above, functions can be managed as may include user facial recognition, gesture input, voice control, audio or video recording, GPS functionality, call ring tones, and the like. Any interface that allows a user to activate, deactivate, or change an operational mode of a function or element can be automated as well using such a process. Once the device learns the behavior with a minimum level of confidence, the device can take over performing the behavior.

Figure 5:
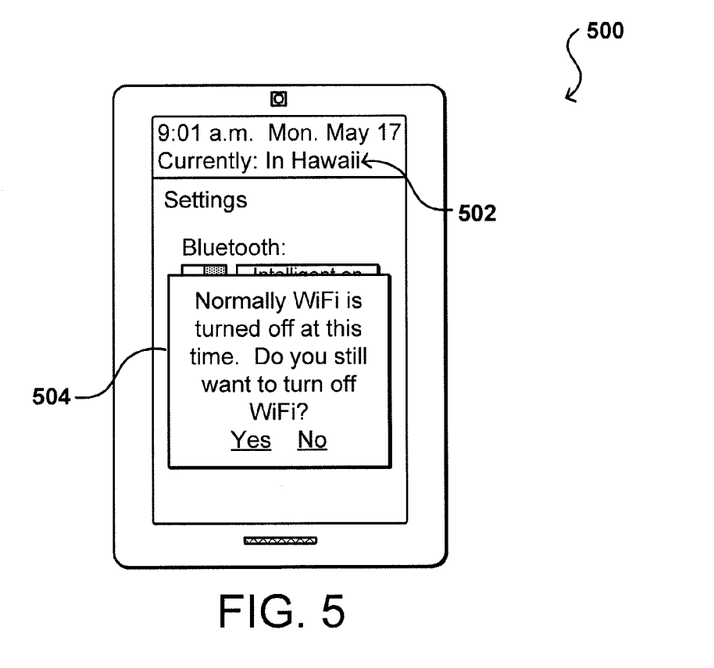
FIG. 5 illustrates an example display when a device detects an exception in accordance with various embodiments.

In certain situations, at least one environmental or contextual value might vary from the predicted behavior. For example, a user might have an appointment that causes the user to be later to work than usual, or might go on vacation, which causes the device to be in unexpected places at certain times when actions are normally taken. In some embodiments, the device might not perform an action unless certain expected variable values are met, such as the user being in a particular place at a particular time. In other embodiments, the device might prompt the user as to whether the user still wants the action to be performed, even though the behavior deviates or presents an exception from normal behavior. For example, FIG. 5 illustrates an example device state 500 wherein the device is determined to be in an unexpected location 502 at a time on a weekday when the user is typically at work. If the user has a calendar entry such as "on vacation" the device might decide not to prompt the user. If, however, the device does not have any context as to whether the user is working in a different location or will otherwise behave similarly in that unexpected location, the device can generate a prompt 504 asking the user whether to perform the expected behavior. In this way, the user can provide a determination as to whether the action should still be performed. Further, the device can determine, based at least in part upon the user response, whether information for the exception should be added to the behavior data or discarded as being irrelevant to typical behavior, etc.

Figure 6:
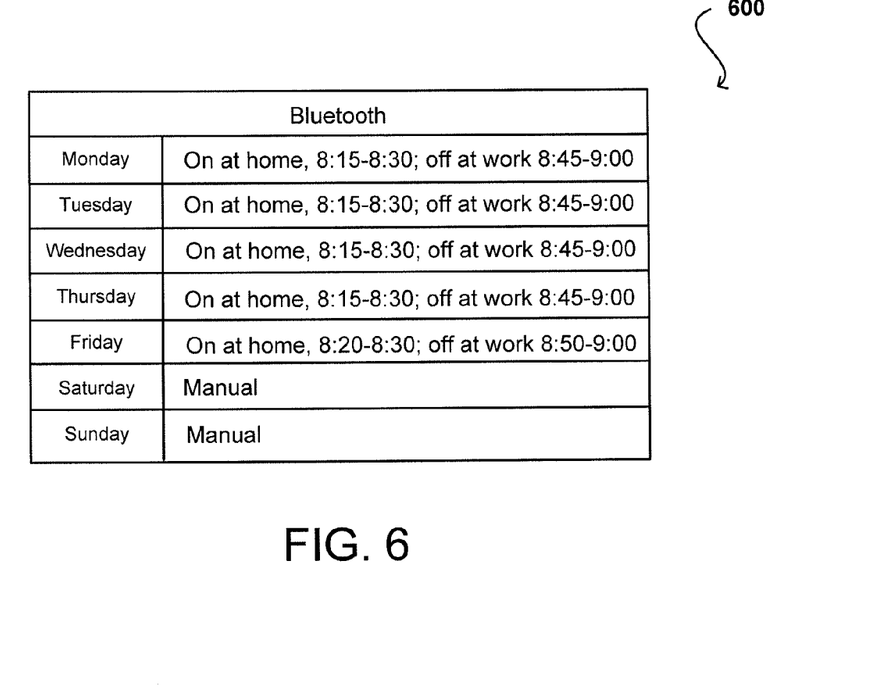
FIG. 6 illustrates an example table of learned user behaviors that can be used in accordance with various embodiments.

FIG. 6 illustrates one example 600 of a way in which predicted behavior can be tracked for a user based upon behavioral information. It should be understood that there can be many additional data values stored in any of a number of different ways, and that the displayed table is simplified for purposes of explanation. In this example, it can be seen that the user typically turns on Bluetooth over a similar range of times each weekday, when the user is still at home, and turns Bluetooth off over a similar range of times each weekday when getting to work. In this example, the information reflects that the user tends to leave a little later on Fridays, such that the range is a little different, although in other embodiments the values tracked might be the same across weekdays or weekends. In this example, it is also shown that there is no consensus as to particular times when the user typically activates or deactivates Bluetooth, such that there might be no data entered, or a value might be tracked indicating that the particular functionality should be left to manual control by the user.

Figure 7:
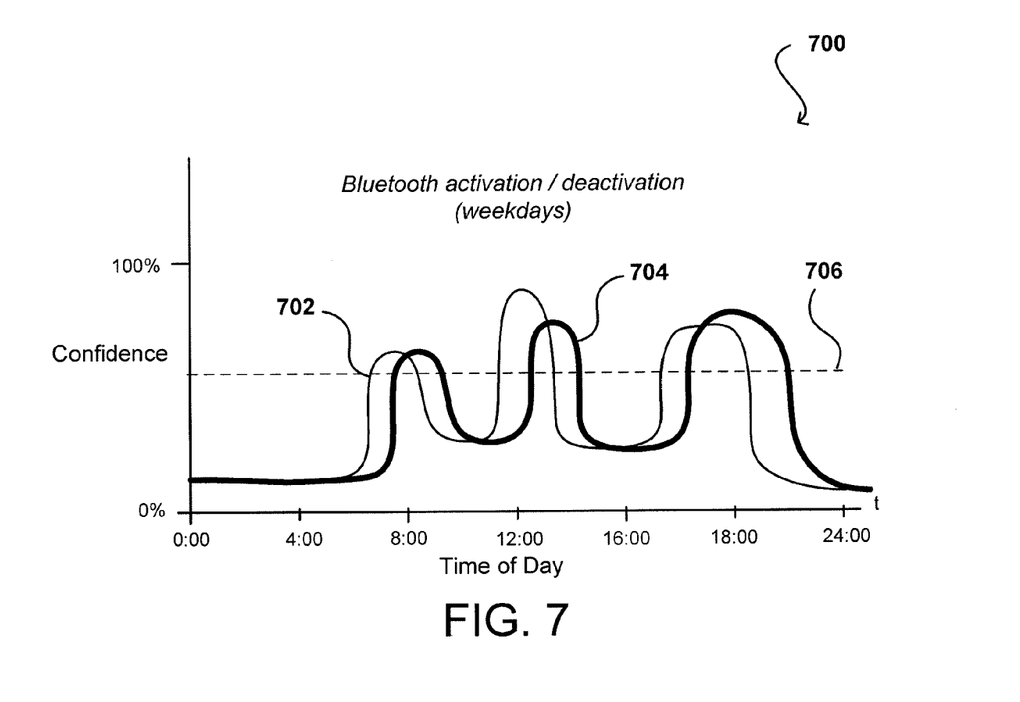
FIG. 7 illustrates an example graph of learned user behaviors that can be used in accordance with various embodiments.

In order to determine one or more appropriate time periods to activate or deactivate certain functionality, enter a different power mode, or perform another such action, an application or service executing on, or associated with, a computing device can attempt to analyze the probability that the user will perform that action at any given time. FIG. 7 illustrates an example graph 700 of two probability curves, indicating a likelihood that the user will activate 702 or deactivate 704 a particular component or functionality (here, Bluetooth) at various points in time throughout a day. As a user repeats the behavior at certain times, the probability at those times will increase. By attempting to model or fit a curve to the data points, one or more windows of time can be determined when the user is likely to perform a certain action. For example, there might be at least one confidence level 706 set, such that any value over that confidence level can be determined to be included in a window for performing that action, as may depend at least in part upon other factors as discussed elsewhere herein. For example, it can be seen that for each curve there are three windows of time when the user typically activates or deactivates Bluetooth on a typical weekday. These might correspond to, for example, when the user is driving to work, when the user is on a lunch break, and when the user is driving home. As can be seen, there can be different periods of time over which each curve is above the confidence level, corresponding to a window of time in which the respective action can be taken. For example, a window of time to activate Bluetooth in the morning may run from 7:45 to 8:07, and if the user meets at least one other criteria during that time, such as being at home or getting into a car, the device can determine it is appropriate to activate Bluetooth at that time. As discussed, these values can change dynamically over time, such that the length and timing of the windows might vary, the number of windows where the probability is above the confidence level can change, etc. As discussed, the behavior data might be weighted or decayed as well, such that older data impacts the probabilities less than more recent data, enabling the confidence level to increase as the behavior changes.

Figure 8:
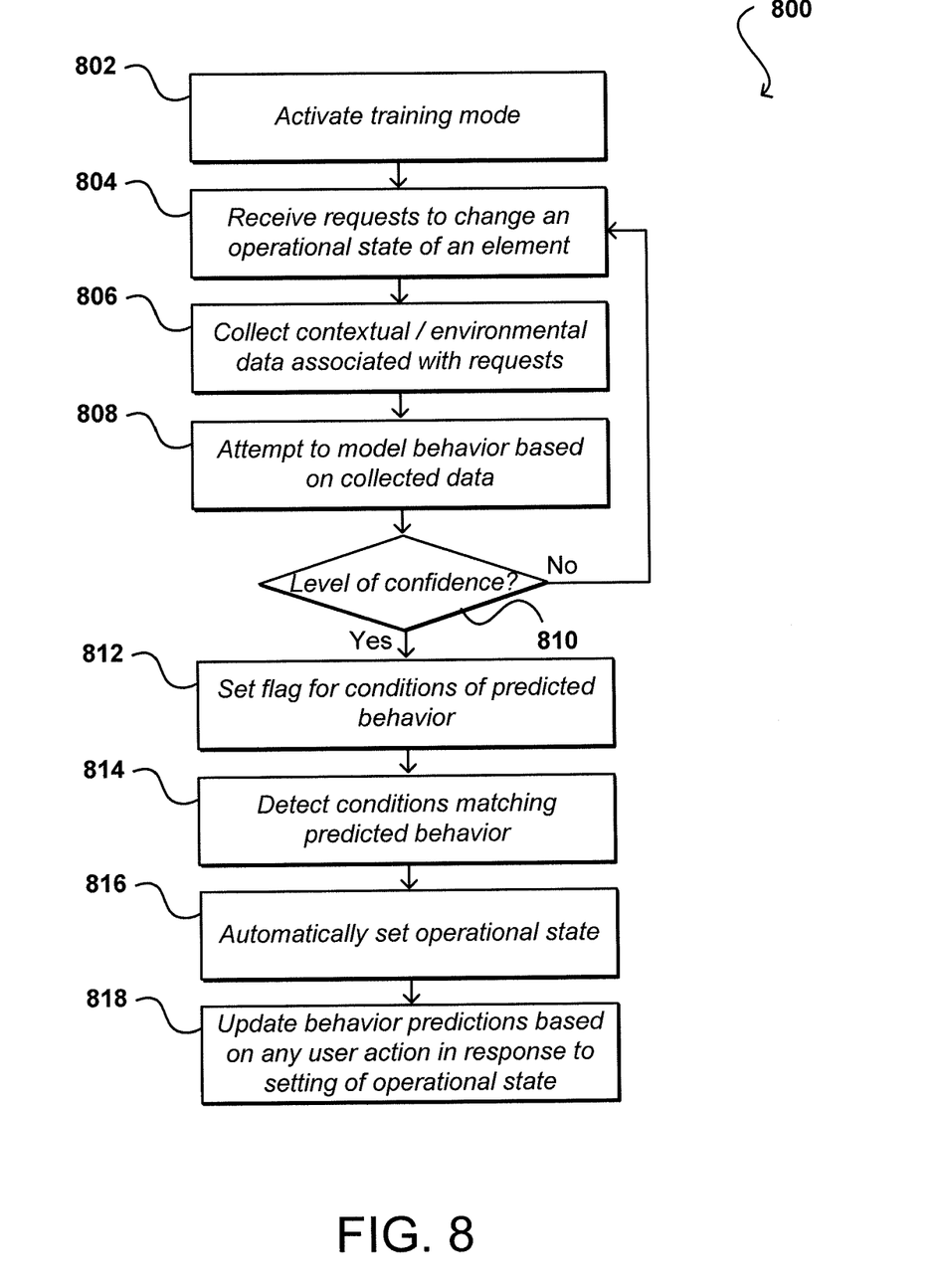
FIG. 8 illustrates an example process for utilizing learned behavior to adjust device functionality that can be used in accordance with various embodiments.

FIG. 8 illustrates an example process 800 for determining when to automatically adjust a state of a functional component of an electronic device that can be utilized in accordance with various embodiments. It should be understood that there can be additional, fewer, or alternative steps performed in similar or alternative orders, or in parallel, within the scope of the various embodiments. Further, while in this example the electronic device is performing much, if not all, of the analysis, it should be understood that a remote system or service could be performing at least a portion of the analysis in other embodiments. In this example, a learning or training mode is activated on the electronic device 802. The mode can be activated automatically upon startup, triggered manually by the user for one or more components, or using any other such approach. When a request or action is taken to change an operational state of a functional component 804, for example, environmental and/or contextual data can be captured that is associated with a timing or location of the request or action 806. For example, the location of the device, the day of the week, identifying information for the user, and other such information can be stored for the type of action or request. Further, anything that can be turned on or off, placed in a different state, or otherwise modified by the user can potentially be monitored within the scope of the various embodiments.

When at least a minimum number of data points has been obtained, one or more statistical analysis or probability modeling approaches can be applied to attempt to determine one or more patterns in the user behavior with respect to that action that can be modeled with at least a minimum amount of probability or level of confidence 808. When at least one point or window of time for predicted behavior can be determined with at least the level of confidence 810, at least one flag, pointer, or other such setting or indicator can be generated indicating a set of one or more criteria that, when met, will cause at least one action to be taken with respect to a functional component or aspect of the device 812. As discussed, this can include activating or deactivating a state of a wireless connection at a certain time and location, entering a particular power mode in response to engaging in a particular activity, etc. When one or more conditions are determined that match the indicator 814, the appropriate operational state can be activated 816. In at least some embodiments, another confidence check can be made to ensure that the determined conditions still meet a minimum confidence threshold or level of probability. Similarly, in some embodiments the user might be prompted or notified before performing the action. Based on any response or action by the user accepting, denying, or reverting a determined action, additional data can be stored and analyzed for use in updating the probability information 818.

In some embodiments, a predicted action being rejected or reverted by the user can result in registering of a "false positive" indication for the action. In such a failure case, such as where the user quickly changes a component back to a prior state, the device can register that the action might not have been appropriate for at least one of the current conditions, and might attempt to determine a difference that should be associated with the change in action, such as the user using a specific application, being with another user, etc. Information for any such occurrence can be stored to an exception table or other appropriate location in various embodiments. In some embodiments, a single "false positive" for a type of action over a given period of time might be interpreted as a one-time or infrequent variance, and may or may not be factored into the action determination. If two or more false positives are determined, for example, data such as a time when the user subsequently performs the action can be included with the behavioral data and used to adjust a timing of the predicted behavior. In some embodiments, such data might cause the window in which the action can be taken to broaden, as the confidence at any given time within that window may decrease. As the behavior again becomes more consistent, at the earlier time or a new time, the size of the window may decrease again, accordingly. The process effectively implements a feedback loop wherein the predicted behaviors can be adjusted based on determined affirmations or false positives on behalf of the user, device, etc. The feedback loop enables the predictions to be tuned or refined over time based on these or other changes in behavior.

In a situation where the new time is sufficiently different from the old time for performing an action, and thus does not fall within a common time window according to a confidence or prediction curve, data for the old time might be marked or flagged as data to be watched, as the particular behavior might no longer be relevant. In such an instance, if the old action still is predicted with a minimum confidence value, the user might be prompted before performing the action until the confidence level increases or the flag is otherwise removed. If a flagged behavior does not occur again for a period of time such as a week or two, the action might be dropped. In other embodiments, the decay values will cause the confidence to decrease over time such that an action that is not repeated for a period of time will be dropped due to the decreased probability. Other approaches to handling behaviors that no longer occur can be used as well within the scope of the various embodiments.

In some embodiments, a user can select whether to tend towards availability or power savings. For example, if there is a ten minute window when a function should be activated, an availability-preferring user might want the function activated at the beginning of that window, while a power-saving user might want the function activated at the end of the window unless otherwise needed. Similarly, an availability-preferring user might want the function deactivated at the end of a window, while a power-saving user might want the function deactivated at the beginning of the window unless that function is currently in use. Other variations can be used as well for other types of users, devices, applications, or situations.

In some embodiments, a device might adjust a functional mode of one or more components in a way that might not be obvious to the user. For example, if a user has not used a wireless data connection for a period of time, and is unlikely to use the data connection very often based upon past behavior, the device might decide to deactivate the data connection for a current period of time. The device might, however, continue to display an icon indicating that the wireless data connection is active. The device in this particular power saving mode can monitor actions by the user, and if the user submits a data request or opens an application that relies upon a data connection (or performs another such action), the device can cause the data connection to be re-activated, etc. Similarly, a cellular connection might be placed in a low power mode, such as where the connection is checked less frequently, when the user is in a mode where the connection should be active, but has not used the connection for a minimum period of inactivity. On the other hand, certain determinations such as determining a user is traveling over 35 MPH (as may be determined by an accelerometer or other such component) might cause Bluetooth to automatically be activate in at least a low-power mode, since the user is determined to be in some type of vehicle. If, as discussed, the user is traveling at over 300 MPH or is at an altitude of 20,000 feet, Bluetooth might automatically be deactivated as the user can be determined with a high level of confidence to be in an airplane or other such mode of transportation. Various other such approaches can be used as well within the scope of the various embodiments, as may further conserve power while minimizing the impact on the user.

Similarly, different components or functions might have different confidence thresholds established, whether by a user, a provider, or another such entity. For example, it might be relatively acceptable if a Bluetooth signal is turned off when it is not in use, and thus can have a relatively low confidence threshold, as the user would just have to turn Bluetooth back on in order to use a Bluetooth device with the computing device. On the other hand, turning off a cellular connection might have a much higher confidence threshold as turning off a cellular signal can result in the user missing a business call, emergency call, or the like, which can be particularly undesirable for many users.

As mentioned, in at least some embodiments a decision to activate or deactivate a functional aspect of a device can be modified based at least in part upon an amount of power remaining on a battery of the device, or another determined aspect relating to the available power. For example, if the device is determined to be unlikely to be charged before running out of power at a current rate of consumption, one or more components can be deactivated or put in a lower power state to attempt to conserve power. Decisions as to which components or functionality to adjust can be based at least in part upon factors such as user behavior, predicted actions, and a critical nature of specific components. Approaches for predicting battery life and adjusting functionality to conserve power are described, for example, in co-pending U.S. patent application Ser. No. 12/973,847, filed Dec. 20, 2010, entitled "Power Management for Electronic Devices," which is hereby incorporated herein by reference.

Figure 9:
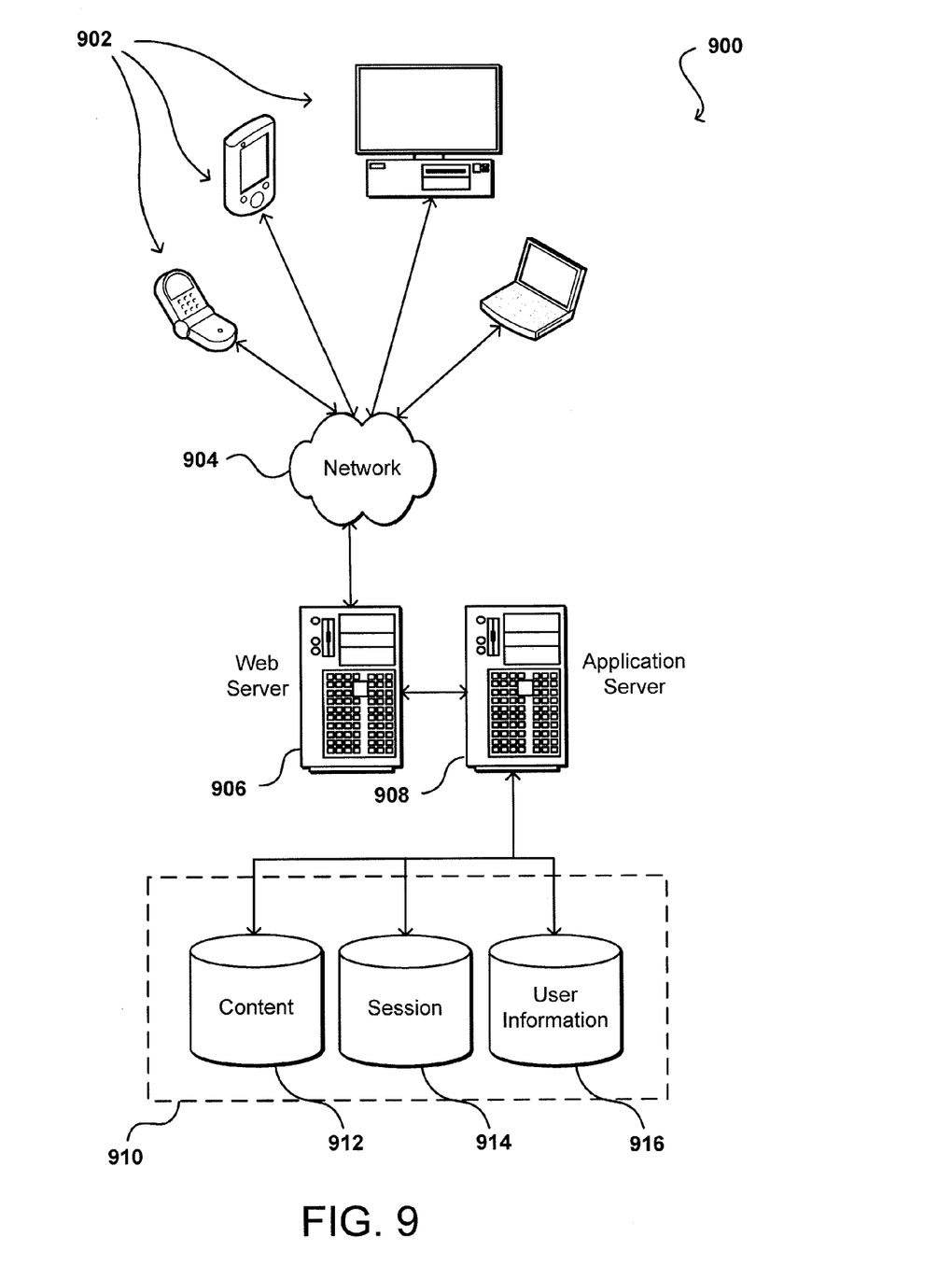
FIG. 9 illustrates an environment in which various embodiments can be implemented.

As discussed, different approaches can be implemented in various environments in accordance with the described embodiments, such as to determine and/or obtain configuration information for a device skin coupled with a computing device. As an example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

Various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of conserving power on an electronic device, comprising:
  detecting one or more instances when a user of the electronic device causes a respective adjustment of an operational state of at least one functional component of the electronic device, the operational state affecting an amount of power consumption of the electronic device;
  for each of the one or more instances, storing data including at least a time and a location of the electronic device when the respective adjustment was caused;
  predicting a pattern of behavior of the user with respect to an adjustment of the operational state of the at least one functional component using at least one statistical probability determination process with respect to the data;
  associating the pattern of behavior of the user with respect to the adjustment of the operational state of the at least one functional component with an approximate location and window of time at which the pattern of behavior is predicted to occur according to a determined statistical probability, the determined statistical probability being based at least in part upon a type of the at least one functional component; and
  in response to determining that the electronic device is at or near the approximate location and window of time at which the predicted pattern of behavior is predicted to occur according to the determined statistical probability, automatically causing the adjustment of the operational state of the at least one functional component.

2. The method of claim 1, further comprising:
monitoring user action with respect to the adjustment of the operational state of the at least one functional component after automatically causing the adjustment; and
updating the determined statistical probability at which the pattern of behavior is predicted to occur based at least in part upon the user action.

3. The method of claim 1, wherein a timing of automatically causing the adjustment of the operational state of the at least one functional component is further based at least in part upon a remaining amount of power on the electronic device.

4. The method of claim 1, wherein predicting the pattern of behavior of the user with respect to the adjustment of the operational state of the at least one functional component is performed at least in part by sending a request to a system or service remote to the electronic device to analyze the data.

5. A method of managing operational states on a computing device, comprising:
monitoring actions of a user with respect to the computing device;
storing contextual information for one or more instances when a user action changes at least one operational state of the computing device;
analyzing the contextual information to predict one or more patterns of user behavior with respect to changes in the at least one operational state of the computing device;
for each pattern of user behavior predicted according to a determined statistical probability, determining one or more respective factors associated with the pattern of user behavior, the determined statistical probability being based at least in part upon a type of at least one functional component of the computing device; and
in response to detecting the one or more factors associated with one of the patterns of user behavior, adjusting the at least one operational state of the computing device.

6. The method of claim 5, wherein the contextual information includes at least a time and location of the computing device when the user changes the at least one operational state of the computing device.

7. The method of claim 5, wherein the contextual information further includes at least one of calendar information, device state information, a speed or altitude of the device, an action of the user, a detected marker, captured audio or image information, day of the week, or nearby users.

8. The method of claim 5, wherein the at least one operational state of the computing device includes at least one operational mode of the at least one functional component of the computing device.

9. The method of claim 5, wherein the at least one operational state of the computing device includes at least one of a plurality of power schemes for the computing device.

10. The method of claim 5, further comprising:
prompting the user for confirmation before adjusting the at least one operational state of the computing device associated with the one of the patterns of user behavior when the determined statistical probability is below a determined level of confidence.

11. The method of claim 5, further comprising:
generating a notification when adjusting the at least one operational state of the computing device.

12. The method of claim 5, further comprising:
monitoring second actions of the user with respect to the computing device after adjusting the at least one operational state of the computing device; and
updating the one or more patterns of user behavior based at least in part upon the monitored second actions.

13. The method of claim 5, further comprising:
enabling the user to override adjusting the at least one operational state of the computing device.

14. The method of claim 5, further comprising:
storing exception data when the user behavior deviates from the one or more patterns of user behavior.

15. The method of claim 14, wherein a detection of multiple instances of the exception data is capable of triggering a reduction in the determined statistical probability associated with one of the patterns of user behavior.

16. The method of claim 14, wherein a detection of multiple instances of the exception data is capable of triggering an adjustment in a window size in which a user action is predicted to occur.

17. The method of claim 5, further comprising:
in response to a deviation in user behavior, discarding at least one of the patterns of user behavior if the user does not repeat an action within a minimum period of time.

18. An electronic device, comprising:
a device processor;
at least one functional component; and
device memory including instructions that, when executed by the processor, cause the electronic device to:
monitor actions of a user with respect to the at least one functional component;
store contextual information for one or more instances when a user changes an operational state of the at least one functional component;
analyze the contextual information to predict one or more patterns of user behavior with respect to changes in the operational state of the at least one functional component;
for each pattern of user behavior predicted according to a determined statistical probability, determine one or more respective factors associated with the pattern of user behavior, the determined statistical probability being based at least in part upon a type of the at least one functional component; and
in response to detecting the one or more factors associated with one of the patterns of user behavior, adjust the operational state of the at least one functional component.

19. The electronic device of claim 18, wherein the instructions when executed further cause the electronic device to:
apply a decay value to the contextual information,
wherein recent user actions affect a determined pattern of behavior more than older user actions.

20. The electronic device of claim 18, wherein the at least one functional component includes at least one of a wireless connection element, a data connection element, a display device, an audio or video recording device, or an input element.

21. The electronic device of claim 18, wherein the contextual information is aggregated for statistical analysis based on whether the one or more instances when the user changes the operational state occurs on a weekday or a weekend.

22. The electronic device of claim 18, wherein the contextual information includes at least one of a detected wireless signal, detected RFID information, detected near field communications (NFC) information, a recognized image or object, a recognized sound, or a nearby device.

23. A non-transitory computer-readable storage medium including instructions that, when executed by a processor of a computing device, cause the computing device to:
monitor actions of a user with respect to at least one functional component of the computing device;

store contextual information for one or more instances when a user changes an operational state of the at least one functional component;

analyze the contextual information to predict one or more patterns of user behavior with respect to changes in the operational state of the at least one functional component;

for each pattern of user behavior predicted according to determined statistical probability, determine one or more respective factors associated with the pattern of user behavior, the determined statistical probability being based at least in part upon a type of the at least one functional component; and in response to detecting the one or more factors associated with one of the patterns of user behavior, adjust the operational state of the at least one functional component.

24. The non-transitory computer-readable storage medium of claim 23, wherein the instructions when executed further cause the computing device to:

enable the user to select which of the at least one functional component is able to be automatically adjusted by the computing device.

25. The non-transitory computer-readable storage medium of claim 23, wherein the instructions when executed further cause the computing device to:

monitor second actions of the user with respect to the at least one functional component after adjusting the operational state of the at least one functional component; and update the one or more patterns of user behavior based at least in part upon the monitored second actions.

* * * * *